Feb. 22, 1944. A. C. BARBER 2,342,110
BOGIE SUSPENSION
Filed June 17, 1943 2 Sheets-Sheet 1
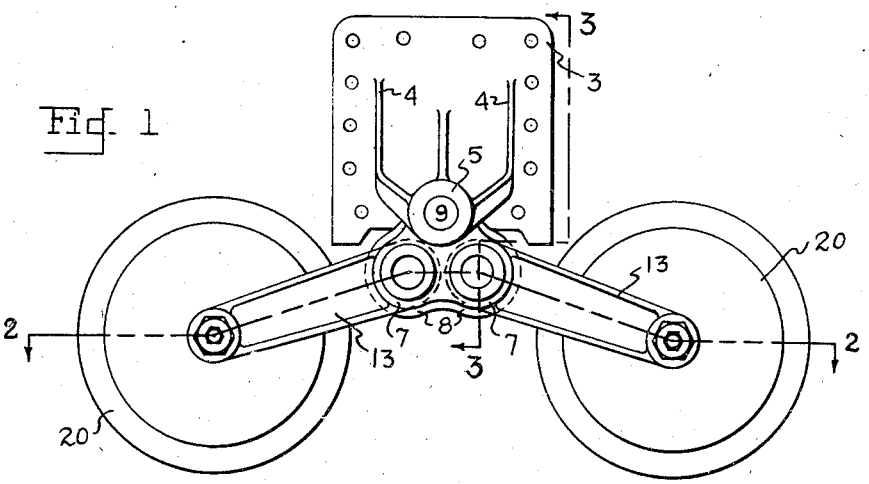
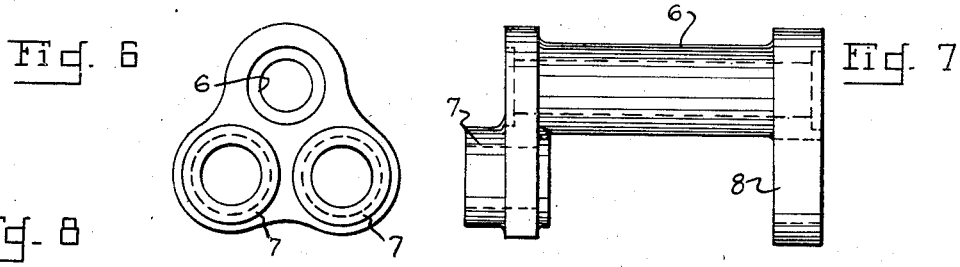
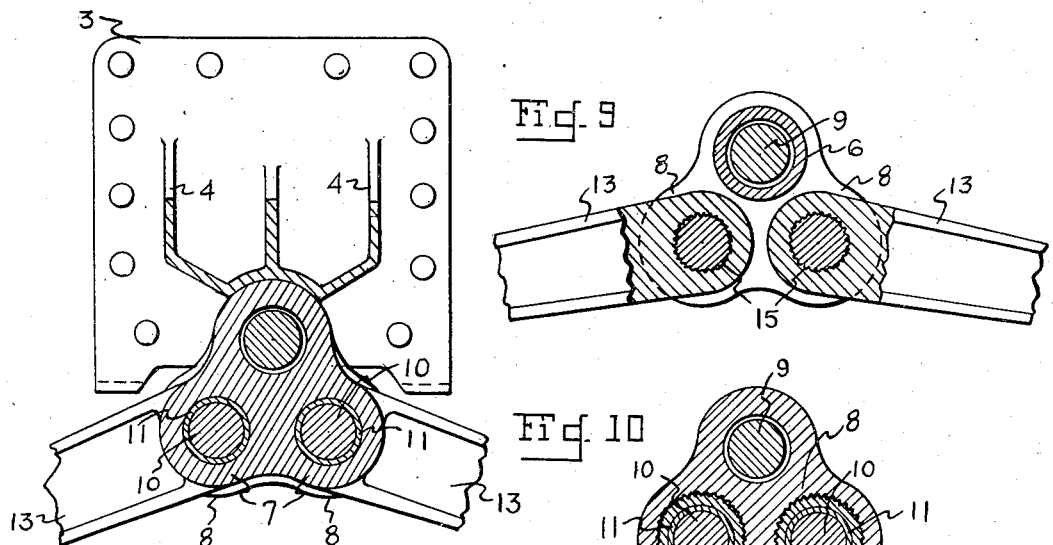
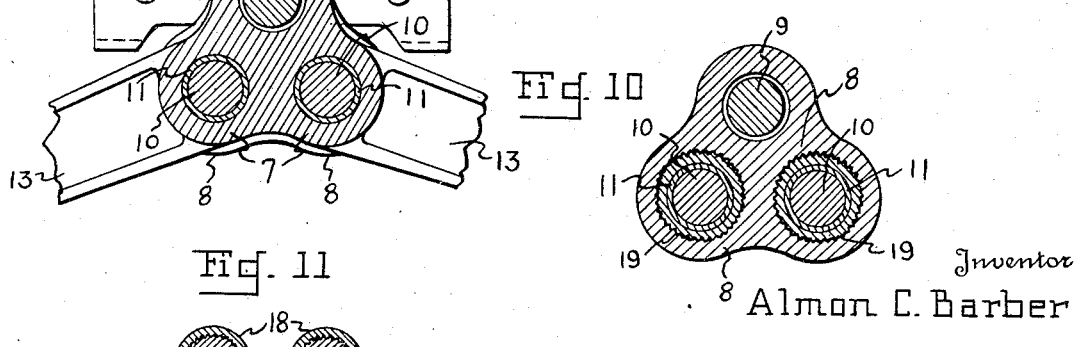
Inventor
Almon C. Barber Feb. 22, 1944. A. C. BARBER 2,342,110
BOGIE SUSPENSION
Filed June 17, 1943 2 Sheets-Sheet 2
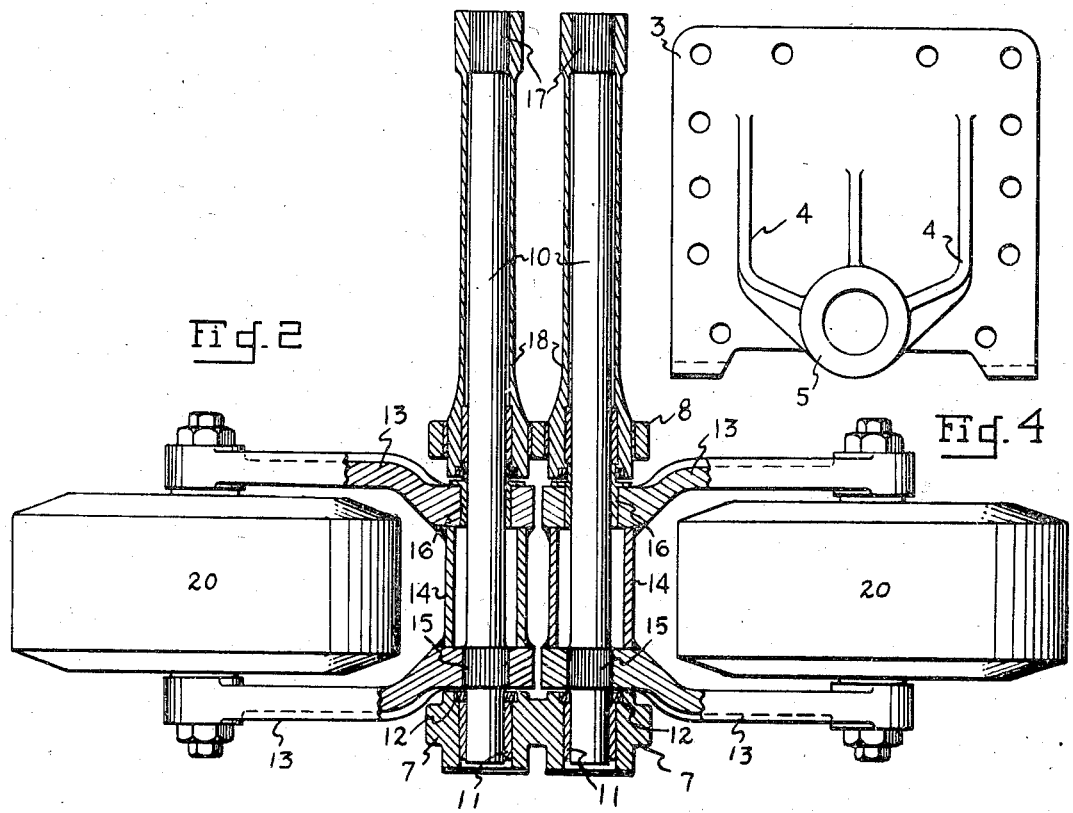
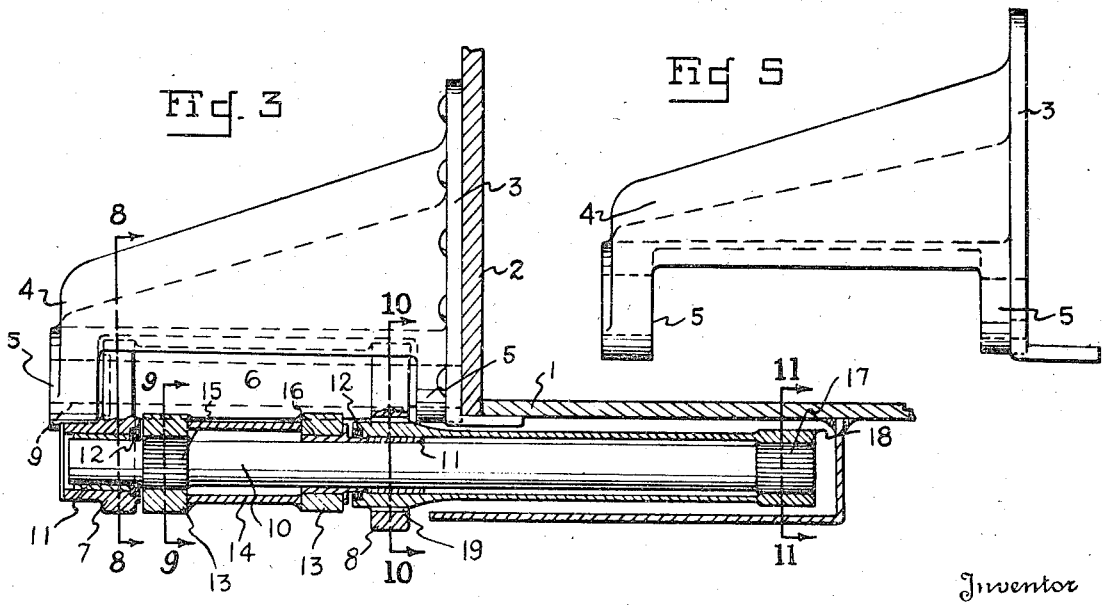
Inventor
Almon C. Barber
By C. E. Herrstrom & H. E. Thibodeau
Attorneys Patented Feb. 22, 1944

2,342,110

UNITED STATES PATENT OFFICE 2,342,110

BOGIE SUSPENSION

Almon C. Barber, Detroit, Mich.

Application June 17, 1943, Serial No. 491,236

9 Claims. (Cl. 280—124)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel bogie suspension for use particularly with heavy vehicles such as combat tanks.

The invention involves the use of torsion bars, and while such bars are well known in the art, they are usually mounted in such a manner as to respond to every vertical displacement of the wheels. The primary object of this invention, in this connection, is to provide a two-wheel bogie wherein equal and opposite movements of the wheels do not affect the torsion bars but rather result in a free pivotal movement of the entire suspension. Each wheel in the bogie has a torsion bar.

Another object of the invention is to distribute between both bars any substantial torsion resulting from unequal displacement of the wheels. These objects are accomplished by pivotally mounting on the vehicle a bearing member or cradle for each bogie. A pair of torsion bars is mounted in each cradle and carries the arms which in turn carry the wheels. One end of each bar is fixed to the cradle and the other end is projected a considerable distance beyond the cradle. The latter end is connected back to the cradle by a torsion member, such as a tube, fixed to both parts. By this means, torsion in a given bar is communicated from this extended end through the tube, back to the cradle and thence to the other bar, whereby a substantial torsion resorting from either wheel is distributed between both bars as previously set forth.

In the drawings:

Figure 1 is a side elevation of the device;

Figure 2 of the section on the lines 2—2 of Figure 1;

Figure 3 of the section on the lines 3—3 of Figure 1;

Figure 4 is a side elevation of the supporting bracket;

Figure 5 is an elevation of the bracket at right angles to Figure 4;

Figure 6 is an end view of the bearing member;

Figure 7 is a side view thereof and

Figures 8, 9, 10 and 11 are sections on the lines 8—8, 9—9, 10—10, 11—11, respectively, of Figure 3.

In Figure 3 the numerals 1 and 2 designate respectively the floor and a side wall of a vehicle such as, for example, a track-laying combat tank. According to the invention the wheels are mounted in bogies as is usual in heavy combat vehicles, with two wheels in each bogie.

Each such bogie includes a bracket 3 fastened to the corresponding side wall 2 and having an outwardly extending and suitably reinforced supporting arm 4 formed with a pair of ears 5 alined transversely of the vehicle. The ears 5 are designed to receive between them a cradle including a bearing sleeve 6 formed at each end with a pair of additional bearings 7 and 8 as shown in Figures 1 and 7. The bearings 7 at one end aline respectively with the bearings 8 at the other end as may be seen in Figures 2 and 3.

The bearing 6 is pivotally supported between the ears 5 on a suitable pin 9 mounted in the ears. Each pair of alined bearings 7 and 8 supports a torsion bar 10 with suitable bushings 11 and washers 12, extended a substantial distance inwardly beneath the vehicle as shown in Figures 2 and 3.

On each bar 10 is mounted a double arm 13, the elements of which are joined by a spacer tube 14 welded to and enclosing a portion of the bar. The arms extend in opposite directions from the brackets 3, as shown in Figures 1, 2 and 9. One of the elements of each double arm is fixed into the corresponding bar 10 by a spline or serration 15. The remaining elements may be free to turn on the bar through a bushing 16. The inner end of the bar is similarly splined or serrated at 17 for locking with one end of a tube 18 enclosing and extending along the bar 10 into the corresponding bearing 8, where it is likewise splined or serrated at 19 to the bearing, as shown in Figure 10. Each double arm 13 supports a wheel or roller 20 for rolling on the ground or engaging a track, as desired. A roller for the latter purpose is illustrated.

In the operation of the device, when one of the wheels 20 moves up and the other moves down an equal distance, the entire assembly merely swivels on the pin 9 without torsion in the bars 10. When one of the wheels is caused to swing at a greater speed or through a larger arc than the other, it produces torsion in its bar 10 through a serration 15. If the degree of torsion is substantial, it will be transmitted in part from the bar 10 through the serrations 17 to the tube 18 and thence through the serrations 19 to the bearing member 6—8 and from the latter to the other torsion bar 10 through the serrations 15 of that bar. Thus, a substantial degree of torsion is distributed between the bars 10, while slight torsion is absorbed in the bar 10 of the affected wheel.

The specific construction shown and described is not intended as a limitation of the invention, and it will be understood that various alterations may be made within the scope of the annexed claims.

What I claim is:

1. In a bogie construction, a supporting bracket, a bearing member pivotally mounted thereon, a pair of torsion bars mounted in said member and extending beyond the same, a pair of wheel-carrying arms fixed to said bars and extending therefrom in opposite directions, and a torsion member fixed to the extended portion of each bar and to the bearing member.

2. In a bogie construction, a supporting bracket, a bearing member pivotally mounted thereon, a pair of torsion bars mounted in said member and extending beyond the same, a pair of wheel-carrying arms fixed to said bars and extending therefrom in opposite directions, and a torsion tube enclosing the extended portion of each bar and fixed to the enclosed extended portion and to said bearing member.

3. In a bogie construction, a supporting bracket, a bearing member pivotally mounted thereon, a pair or torsion bars mounted in said member and extending beyond the same, a pair of wheel-carrying arms splined to said bars and extending therefrom in opposite directions, and a torsion member splined to the extended portion of each bar and to the bearing member.

4. In a bogie construction, a supporting bracket, a bearing member pivotally mounted thereon, a pair of torsion bars mounted in said member and extending beyond the same, a pair of wheel-carrying arms splined to said bars and extending therefrom in opposite directions, and a torsion tube enclosing the extended portion of each bar and splined to the enclosed extended portion and to said bearing member.

5. In a bogie construction, a supporting bracket, a bearing member pivotally mounted thereon and having two pairs of alined ears, a torsion bar received in each pair of ears and extending beyond one of the ears of each pair, a pair of wheel-carrying arms fixed to said bars and extending therefrom in opposite directions, and a torsion member fixed to the extended portion of each bar and to the nearer end of the corresponding pair.

6. In a bogie construction, a supporting bracket, a bearing member pivotally mounted thereon and having two pairs of alined ears, a torsion bar received in each pair of ears and extending beyond one of the ears of each pair, a pair of wheel-carrying arms fixed to said bars and extending therefrom in opposite directions, and a torsion tube enclosing the extended portio of each bar and fixed to the enclosed extended portion and to the nearer ear of the corresponding pair.

7. In a bogie construction, a supporting bracket, a bearing member pivotally mounted thereon, a pair of torsion bars mounted in said member and extending beyond the same, a pair of double wheel-carrying arms fixed to said bars and extending therefrom in opposite directions, one element of each arm being fixed to its bar and the other element being loosely mounted thereon, and a torsion member fixed to the extended portion of each bar and to the bearing member.

8. In a bogie construction, a supporting bracket, a bearing member pivotally mounted thereon and having two pairs of alined ears, a torsion bar received in each pair of ears and extending beyond one of the ears of each pair, a pair of double wheel-carrying arms fixed to said bars and extending therefrom in opposite directions, one element of each arm being fixed to its bar and the other element being loosely mounted thereon, and a torsion member fixed to the extended portion of each bar and to the nearer end of the corresponding pair.

9. In a bogie construction, a supporting bracket, a bearing member pivotally mounted thereon and having two pairs of alined ears, a torsion bar received in each pair of ears and extending beyond one of the ears of each pair, a pair of double wheel-carrying arms fixed to said bars and extending therefrom in opposite directions, one element of each arm being fixed to its bar and the other element being loosely mounted thereon, and a torsion tube enclosing the extended portion of each bar and fixed to the enclosed extended portion and to the nearer ear of the corresponding pair.

ALMON C. BARBER.